(12) United States Patent
Tsai

(10) Patent No.: US 6,907,465 B1
(45) Date of Patent: Jun. 14, 2005

(54) ELECTRONIC COMMERCE USING PERSONAL PREFERENCES

(76) Inventor: Daniel E. Tsai, 39 Bayberry Dr., Atkinson, NH (US) 03811

(*) Notice: Subject to any disclaimer, the term of this patent is extended or adjusted under 35 U.S.C. 154(b) by 802 days.

(21) Appl. No.: 09/668,235

(22) Filed: Sep. 22, 2000

(51) Int. Cl.⁷ .............................................. G06F 15/16
(52) U.S. Cl. ...................................... 709/232; 709/206
(58) Field of Search ................................ 709/232, 206, 709/200, 202, 203, 217, 219, 226, 229, 236, 225

(56) References Cited

U.S. PATENT DOCUMENTS

| | | | | |
|---|---|---|---|---|
| 5,870,548 A | * | 2/1999 | Nielsen ........................ 709/206 |
| 5,918,236 A | * | 6/1999 | Wical .......................... 715/500 |
| 6,029,165 A | * | 2/2000 | Gable ............................. 707/3 |
| 6,047,327 A | * | 4/2000 | Tso et al. .................... 709/232 |
| 6,067,539 A | * | 5/2000 | Cohen ............................. 707/2 |
| 6,111,883 A | * | 8/2000 | Terada et al. ................ 370/401 |
| 6,122,617 A | * | 9/2000 | Tjaden ........................ 704/260 |
| 6,170,013 B1 | * | 1/2001 | Murata ........................ 709/229 |
| 6,182,066 B1 | * | 1/2001 | Marques ........................ 707/5 |
| 6,266,668 B1 | * | 7/2001 | Vanderveldt et al. ......... 707/10 |
| 6,288,717 B1 | * | 9/2001 | Dunkle ........................ 345/763 |
| 6,304,914 B1 | * | 10/2001 | Deo et al. ..................... 709/247 |
| 6,311,178 B1 | * | 10/2001 | Bi et al. ......................... 707/3 |
| 6,320,974 B1 | * | 11/2001 | Glaze et al. ................. 382/115 |
| 6,629,150 B1 | * | 9/2003 | Huded ......................... 709/247 |
| 6,665,659 B1 | * | 12/2003 | Logan ............................. 707/3 |
| 6,681,223 B1 | * | 1/2004 | Sundaresan .................... 707/6 |
| 6,704,278 B1 | * | 3/2004 | Albert et al. ................ 370/216 |
| 6,721,784 B1 | * | 4/2004 | Leonard et al. .............. 709/206 |
| 6,727,927 B1 | * | 4/2004 | Dempski et al. ............. 345/853 |
| 2002/0004783 A1 | * | 1/2002 | Paltenghe et al. ............. 705/41 |
| 2002/0054089 A1 | * | 5/2002 | Nicholas et al. ............. 345/745 |
| 2004/0054630 A1 | * | 3/2004 | Ginter et al. .................. 705/53 |

FOREIGN PATENT DOCUMENTS

GB          2340264 A    *  2/2000     ............. G06F/9/44

* cited by examiner

*Primary Examiner*—Bunjob Jaroenchonwanit
(74) *Attorney, Agent, or Firm*—Fish & Richardson P.C.

(57) ABSTRACT

A system to enable a person to interact in both a physical world and an electronic world is described. The system includes a server that delivers news and information. The server includes a matching process that matches information from a client with information from other hosts that are also sending information to the server. The matching process includes matching wrapper information from a received capsule, the wrapper information including information that determines the use of the information content of the capsule. The system also includes a client user device. The client user device includes a database of personal interests and a process that either offers and/or requests services and information based on the personal interests. The process includes a process to wrap content with control information designating ownership of the content, the time span the content is valid, and rules specifying how content is to be matched.

50 Claims, 18 Drawing Sheets

FIG. 7 122

| Contents | Type | 122a |
| | MatchableContents | 122b |
| | Fillable | 122c |
| | Contents | 122d |

122'

| XML |
| Restaurant, seafood |
| " _ " |
| < restaurant ><seafood>< name > ___ </ name ></ seafood ></ restaurant > |

FIG. 8 124

| Ownership | Identifier Type | 124a |
| | Id | 124b |
| | Primary Host | 124c |

124'

| Handle \| email \| name |
| happyfrog |
| Myhost.net |

FIG. 9 126

| Location span | Scope | 126a |
| | Current Location | 126b |

126'

| Micro \| Local \| City \| State \| Country \| Global\| | |
| Country | USA |
| State | Massachusetts |
| City | Boston |
| Neighborhood | South End |
| Street | Commonwealth Ave. |

FIG. 10

| Life span | Created | 128a | 1/1/1999 |
|---|---|---|---|
| | Expires | 128b | 2/1/2001 |
| | Starts | 128c | 8:30 am |
| | Ends | 128d | 5:30 pm |
| | Repeat cycling | 128e | Daily |

| Binding | Audience 130a | Allow Bind | Site1.com |
| --- | --- | --- | --- |
| | | Allow Bind | Site2.com |
| | | Allow Bind | Person@site4.org |
| | | Deny Bind | Company5 |
| | | Allow host trusted | Host1.org |
| | | Allow Bind Topic | :restaurants:seafood |
| | Match rules 130b | Match audience exact<br>Match content approximate quality 75%<br>Match location exact<br>Match local, trusted | |
| | Fill rules 130c | summary | |
| | Privacy settings 130d | Notify: <u>IN</u> \| OUT \| BOTH \| IN+ \| OUT+<br>Encrypted Contents YES \| <u>NO</u> | |
| | Quick bindings 130e | Allow \| Deny audience, id<br>Allow site4.org, id00001 | |

| Transmittal Info 134 | Mode 134a | <u>Request</u> \| Offer |
| --- | --- | --- |
| | Nature 134b | <u>Information</u> \| Connect \| Run \| Transact \|<br>Relay \| Store \| Calculate \| Other |
| | ID 134c | Dt@myIsp.net, Thread 1002223 |
| | Title 134d | Fun place to eat lunch with wife and kids. |

FIG. 14A

```
ExchangeCapsule {
CONTENTS {
Type Fragment;
BeginContent
:restaurant:Chinese# royalpanda
  {.address=10 main street, Cambridge,MA 02139;
    .telephone=617-444-9999;
    .cuisine = :Chinese:Cantonese;
    .specialty = :seafood; :General Gau's chicken;
    .specials = (REFER) http://www.royalpanda.net/specials
    .reservations = http://www. royalpanda.com/reservations;
//go to the link for reservations
    .hours = "11-10 daily";
EndContent
}
OWNER {RoyalPanda.com}
LOCATION
{
   Country: USA;
   State: Massachusetts;
   City: Cambridge;
   Neighborhood: Central Square;
   Street: 10 Main Street;
   Zipcode: 02139;
}LIFESPAN
{
   Created 1/1/1999;
   Expires 1/1/2001;
   From ANY;
   To ANY;
   Repeat Daily;
}
BINDING
{
   Allow bind all;
   Notify OUT+;
   Encrypt NO;
   Match host all;
   Allow relay all;
   Allow bind topic {:restaurant:Chinese;
:banquets:chinese;cuisine:Chinese:Cantonese;}
}
TRANSMITTAL
{
   Mode Offer;
   Nature Information;
   ID info@royalPanda.net
   Title "Dine at the Royal Panda Restaurant"
}
}
```

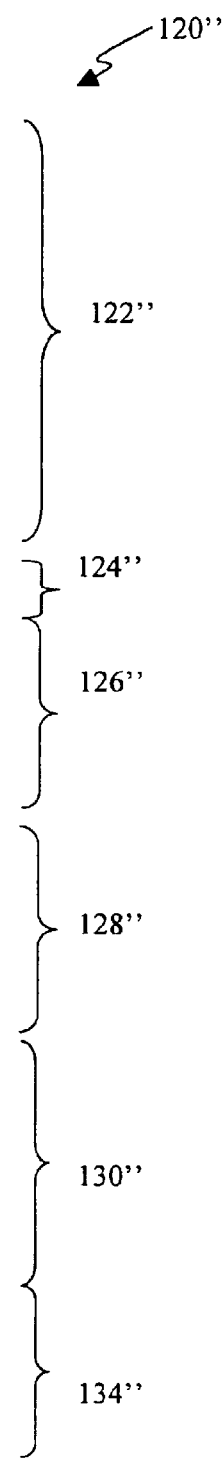

```
<ExchangeCapsule>
<CONTENTS type=fragment>

:restaurant:Chinese# royalpanda
  {.address=10 main street, Cambridge,MA 02139;
   .telephone=617-444-9999;
   .cuisine = :Chinese:Cantonese;
   .specialty = :seafood; :General Gau's chicken;
   .specials = (REFER) http://www.royalpanda.net/specials
   .reservations = http://www. royalpanda.com/reservations;
//go to the link for reservations
   .hours = "11-10 daily";

</CONTENT>

<OWNER> RoyalPanda.com      </OWNER>
<LOCATION>
    <Country>: USA</Country>
    <State>: Massachusetts</State>
    <City>: Cambridge<City>
    <Neighborhood>: Central Square</Neighborhood>
    <Street>: 10 Main Street<Street>
    <Zipcode>: 02139</Zipcode>
</LOCATION>
<LIFESPAN>
    <Created> 1/1/1999</Created>
    <Expires> 1/1/2001</Expires>
    <From> ANY<From>
    <To> ANY</To>
    <Repeat> Daily<Repeat>
</LIFESPAN>
<BINDINGS>
   Allow bind all;
   Notify OUT+;
   Encrypt NO;
   Match host all;
   Allow relay all;
   Allow bind topic {:restaurant:Chinese;
:banquets:chinese;cuisine:Chinese:Cantonese;}
</BINDINGS>
<TRANSMITTAL>
   <Mode> Offer           </Mode>
   <Nature> Information   </Nature>
   <ID> info@royalPanda.net  </ID>
   <Title> "Dine at the Royal Panda Restaurant" </Title>
</TRANSMITTAL>
</ ExchangeCapsule >
```

ELECTRONIC COMMERCE USING PERSONAL PREFERENCES

BACKGROUND

This invention relates to electronic commerce.

Computers are often used to store and maintain databases. Databases can be of many types. One type of database stores data in tabular form, e.g., relational databases. Other databases include hierarchical databases and flat-file structures that are similar to a table or a spreadsheet. Another type of database is the so-called object-oriented database.

The world-wide-web stores information in resources that can be found through an address such as a uniform resource locator (URL). Wireless devices are also known for use with the Internet. Data exchange with wired of wireless devices involves transmission of data via E-mail address or web pages. Such data transmission can be secure, but data regarding personal preferences can be obtained by host systems whether or not intended.

SUMMARY

According to an aspect of the present invention, a method of notifying users of electronic services includes dynamically matching custom information stored on distributed databases with information that users hold in a user device on topics of interest.

According to an additional aspect of the present invention, a client device includes a computing device that executes computer instructions and a database of personal interests. The client device also includes a process that either offers and/or requests services and information based on personal interests of a user. The process includes a process to wrap content with control information designating ownership of the content, the time span the content is valid, and rules specifying how content is to be matched.

According to an additional aspect of the present invention, a system to enable a person to interact in both a physical world and an electronic world includes a server that delivers news and information. The electronic world has virtual stores and enables online interactions through wired and wireless networks. The system also includes a client user device. The client user device includes a database of personal interests and a process that either offers and/or requests services and information based on the personal interests. The process includes a process to wrap content with control information designating ownership of the content, the time span the content is valid, and rules specifying how content is to be matched.

According to an additional aspect of the present invention, a server system includes a matching process that matches information from a client with information from other hosts that are also sending information to the server. The matching process includes matching wrapper information from a received capsule, the wrapper information including information that determines the use of the information content of the capsule.

According to an additional aspect of the present invention, a method for conducting commerce where information and services are provided to customers includes selectively activating shareable database capsules from information contained in personalized, shared databases. The method also includes distributing the shareable capsules over a network communications medium as matchable capsules, matching the matchable capsules with other complementary matchable capsules and making the existence and results of a match of a pair of matchable capsules visible only if matched capsules have compatible visibility settings.

According to an additional aspect of the present invention, a method for maintaining privacy in exchange of data includes attaching a directional visibility flag to a request or offer for information or services and distributing the request or offer. The method also includes matching the visibility setting of a request or offer to complementary items in a complementary one of the request or offer. The method also includes processing the match in accordance with the visibility specification to prevent any information about the existence or results of the match from being communicated to contrary to the visibility flags.

According to an additional aspect of the present invention, a computer readable medium stores a data structure. The data structure represents a shareable database capsule including a content field that contains offers and requests for information and services and a transmittal information field that contains information to control the distribution, matching and privacy of the sharing of the database capsule.

According to an additional aspect of the present invention, a system includes a server that includes a matching process that matches information from a client with information from other hosts that are also sending information to the server. The matching process includes a matching process to match wrapper information from a received capsule, where the wrapper information includes information that determines the use of the information content of the capsule. The system also includes a client user device to interact with the server device. The client user device includes a database of personal interests and a process that either offers and/or requests services and information based on the personal interests. The process includes a process to wrap content with control information designating ownership of the content, the time span the content is valid, and rules specifying how content is to be matched.

One or more aspects of the invention may have one or more of the following advantages.

The invention connects people and electronic services by dynamically matching custom information stored on distributed databases. Users hold information on topics of interest. The information can be accumulated and organized over time, produced or collected from various sources and carried on a fixed computing device, or portable computing device like a personal digital assistant (PDA) or cell phone. People can specify interests in hobbies, dining preferences, research topics, news, social and cultural interests, personal information like clothing sizes, or activities to participate in. Companies and other organizations can supply information on products and services, useful facts, and other information in response to requests for such information or as a general broadcast of information.

The basic content of the information is wrapped with information about its owner, the time span it will be valid, its audience, what pieces of information are to be matched, what information is to be filled in, and what other actions are to occur if a match occurs. These data capsules can be expressed as small fragments of information used to locate and obtain further information.

This system is suited, in particular, to mobile computing and communications situations because browsing, i.e., interacting with a device in a changing mobile environment is highly limited. Instead of browsing for information e.g., browsing the web, or receiving preset data channels, users (mobile and fixed) specify requests or offers for information and services by sharing pieces of personalized databases. The information shared in the course of interaction is shielded via privacy features.

The invention enables users to control publication and dissemination of personal, e.g., profile information, thus preventing hosts from knowing preferences ahead of time and channeling information to the user. The invention enables users to manage their own databases of information and specify or focus information that is of interest. A user's temporal interest can be related to a user's current physical location. Information is sent to a matching process that tries to match the information with information that a host provides. The matching process can be an intermediary service or a peer-to-peer process. An intermediary matching server or process can be controlled such that the host may never see private information even though its been analyzed by the intermediary.

BRIEF DESCRIPTION OF THE DRAWINGS

FIGS. 7–12 are diagrams depicting details and examples of the data structure of FIG. 6.

FIG. 14A is a diagram depicting a plain text representation of an exemplary capsule implemented.

FIG. 14B is a diagram depicting a plain text representation of an exemplary capsule implemented in XML.

DESCRIPTION

Figure 1:
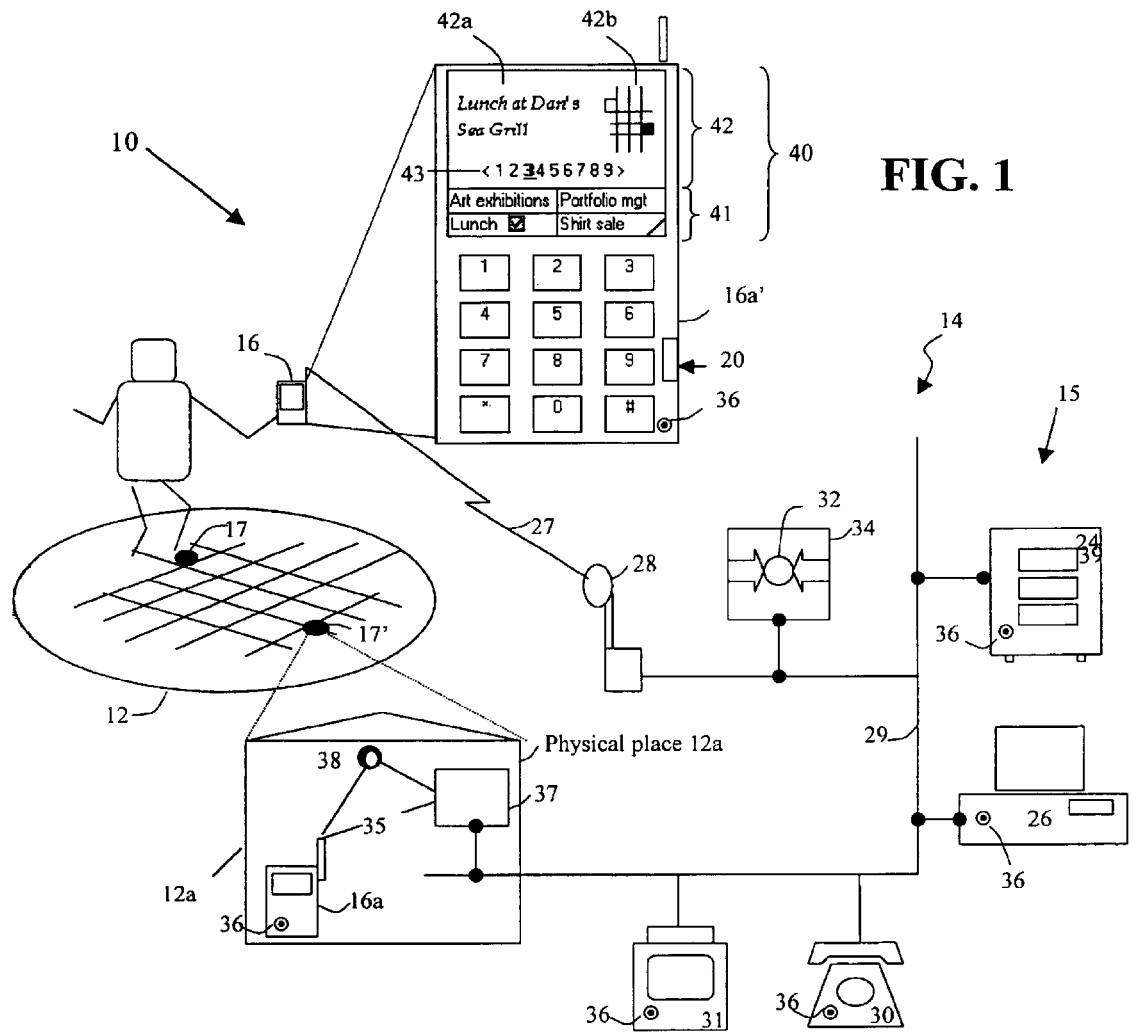
FIG. 1 is a block diagram of an arrangement to interface a virtual world to a physical world.

Referring to FIG. 1, an arrangement 10 to enable a person to interact in both a physical world 12 and an electronic (virtual) world 14 is shown. The physical world 12 contains stores, products, machines, other people, offices, etc., generally 12a. The electronic world 14 contains servers 15 that deliver news and information, and provide virtual stores and an online presence for the physical stores, products, machines, etc. The servers 15 also provide interactions with people, through wired and wireless networks.

A person occupies a location 17 in the physical world and interacts with the virtual world 14 through a computer, a cell phone or personal digital assistant (PDA) or other types of electronic devices collectively referred to as a client device 16. In some embodiments, portable, digital client devices 16 are used to interface a person between virtual and physical worlds. In arrangement 10, the client devices 16 contain a database that can hold a person's preferences and interests. The database is stored in computer readable form within the device 16. The electronic world 14 offers information or services to the person. The device 16 includes an executable process 20 that associates these three realms in a useful manner.

The wireless client device, e.g., a PDA 16a, is shown connected in a network comprised of servers 24, desktop PCs 26, networked appliances 31, wireless receiver servers 28, and smart telephones 30. That is, the electronic world 14 includes wireless and fixed servers 24, 26 and 28 on a network 29. The devices 16, if wireless, have a wireless transmission 27 to the receiver servers 28, which are connected to the Internet.

Each device 16, 24, 26, 28, etc. has shareable databases 36. Each device 16, 24, 26, and 28, either offers and/or requests services and information from others of the devices 16, 24, 26, and 28. Information capsules about each shared database are distributed across the network to client wired and wireless devices 16. A server 34 with a match process 32 is shown, although this process can be run in any of the aforementioned devices.

Devices 16 that are local to a person's physical location can communicate via close range bandwidths and protocols directly or over a local network in a peer to peer or client server manner. Devices 16 that connect into a global network can use standard communications transmissions for such devices, e.g., Internet and wireless Internet protocols.

The physical location 17 of the client device 16 (or servers) can be part of the information that informs the device or a matching process 32 on a matching server 34 what kind of services are provided or are relevant to the person. For example, the location of a wireless client maybe known as part of the standard protocol for the device. Entities that comprise the physical environment such as stores, hospital, library and so forth have electronic presence also through servers 24 that exist in the virtual world 14.

Stores, machines and other people also have a physical location 17', as well as an electronic presence. In this scenario, the person's client device 16, via a communication process (described below), shares information about the person's interests and physical location, across the network 29. Instead of asking a particular source for an answer, the request for information is formed in a more general manner and matched to information offered over the network 29. The responses may take into account the person's physical location, time and context, and relate to items in both physical and electronic realms.

The client device 16 has a small screen 40 that displays topics of interest 41, a reply item of interest 42, with a small map 42b to get to the place shown 42a. For example, a restaurant whose physical location is at the same general location as the person also has a server 24 that sends information to the display 40 on the client device 16.

The personal information that is stored on the client device 16 is communicated to the host telecommunications device 28. The information can be stored in the client device 16 or could be stored on a private server and host machines could query the private server. A matching host 34 receives the communicated information. The matching host includes a matching process 32 that is coupled to the network 29.

Figure 2:
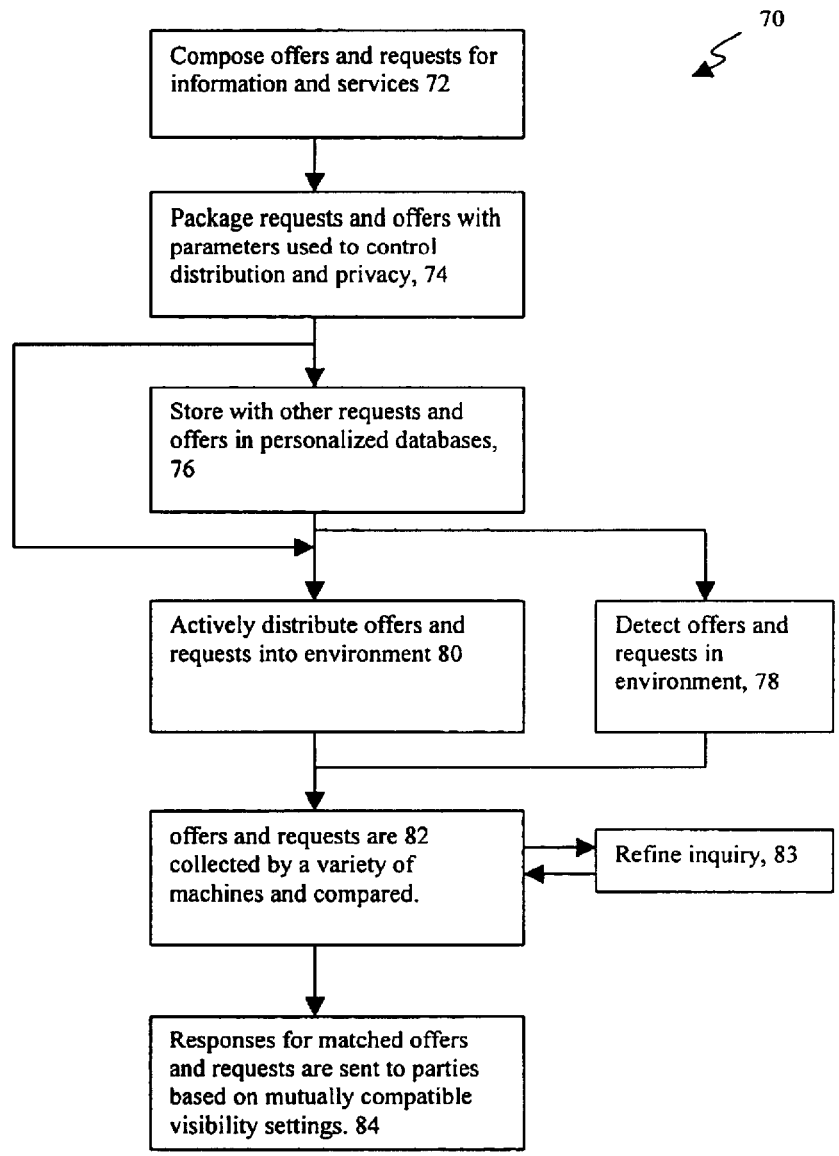
FIG. 2 is a flow chart of an information sharing process.

Referring to FIG. 2, a process 70 of sharing information is shown. Information is shared by composing 72 matchable items such as offers or requests for information or services. An offer or request is packaged 74 with parameters used to control distribution and privacy of the information as it is distributed among computers. The requests and offers are optionally stored 76 in personalized databases containing other topics. Each item within a collective can be selectively activated for sharing based on time, location or other factors. Selected offers and requests are actively distributed 80 into the computing environment. This can be a local interaction between two local devices or via a network. The offers and requests are collected by a variety of machines and compared 82 with information contained within these devices. A matching process 32 is conducted to match corresponding and/or complementary offers and requests. Responses 84 for matched offers and requests are sent to parties based on mutually compatible privacy and distribution settings.

As a result of matching 82, a process can be used to refine 83 a query back to the client or host/server systems until there is a suitable match. For example, if asking for restaurants, a refinement process can include sending a modified inquiry that requests information by subtype of restaurant to reduce the answer size.

Very private information can be handled via local sensing 78 instead of distribution. Once the information is matched and filled either locally or remotely an adequate response is obtained 84. The response can be transmitted and include information, a service, or a referral. The response typically comes from the host. The response is queued and results are displayed on the client device 16. Items within the databases are focused, i.e., selected based on interests of the user expressed in the received capsule. The selection process can be performed automatically through time and location settings for any item. A client device 16 can share focused items over the network. General sharing of private interests can be done via trusted hosts that perform comparisons, as will be described below.

Figure 3:
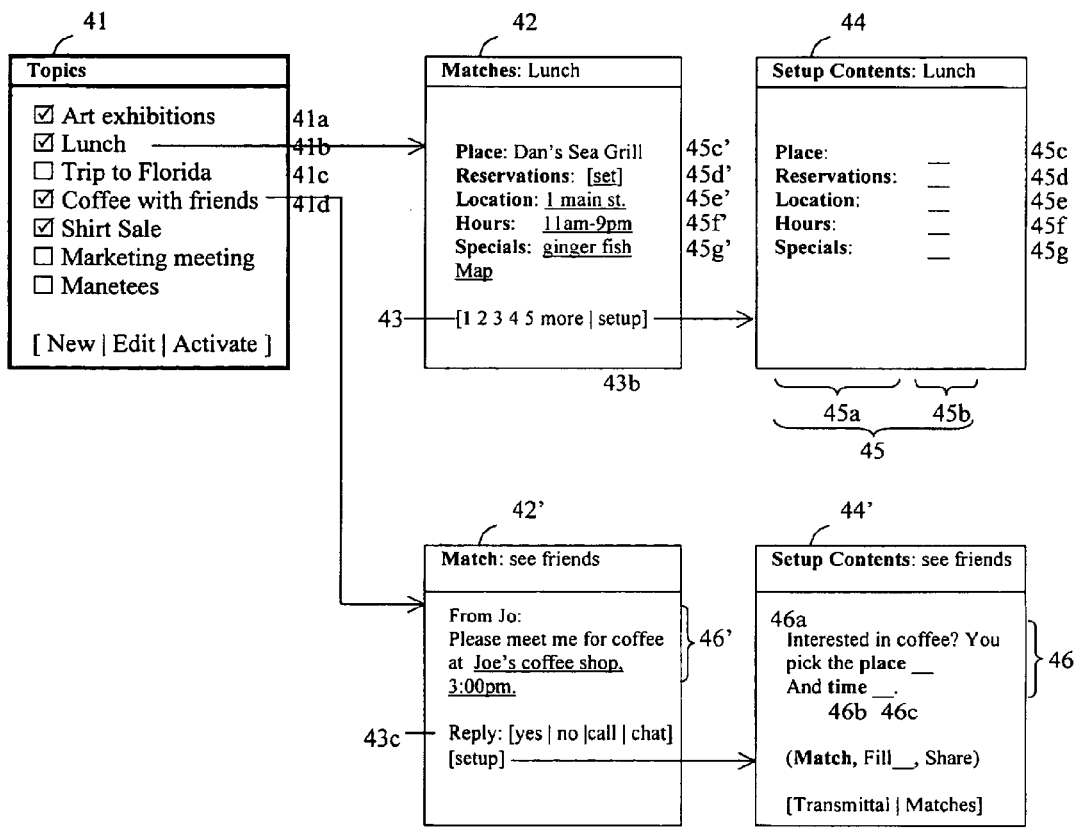
FIG. 3 is a diagram depicting client device screens.

Referring to FIG. 3, content such as web pages, personal data, notes etc. are accumulated and edited to make up one's personalized content. For example, a person's database can have topics 41 such as art exhibitions 41a, lunch preferences 41b, travel plans 41c, social activities 41d, information on hobbies, etc. In this example, the selected or activated topic "lunch", expands to show collected information 42 on a matched restaurant name, such as telephone number, specials, address, directions, etc. Selecting the link to "reservations" can initiate a call to the restaurant using a voice connection, or a data message to make a reservation.

Matches for shared topics 41 are the result of content 44 that has shareable, matchable, and fillable elements. The topic "Lunch" 41b has contents 44 that are tabular 45 with attributes 45a and blank field values (i.e., slots) to fill 45b. In this example, the content setup record with attribute "Place" and blank value 45c, is matched and shown as "Place: Dan's Sea Grill". Similarly, the values for the attributes "Reservations" 45d, "Location" 45e, "Hours" 45f, and "Specials" 45g are filled in and shown in the match 42, with lines 45d', 45e', 45f', 45g' respectively.

A second example match 42' is shown with topic "Coffee for friends" 41d. Whereas the match displayed for "Lunch" 41b is tabular, with attributes and filled in values, the match shown for 42' is free form text 46, also with tagged values 46b filled in 46c.

Thus, referring back to FIG. 2, in this example, the topic "Lunch" gets packaged 74 and submitted into a store of other requests and offers. Within a matching process 32 offers and requests are collected. These offers and requests may refer back to other material such as on web sites. Whereas documents on web sites are primarily for reading by people who visit and browse the site, the offers and requests shown here are actively distributed 80 capsules that can be collected by a variety of machines and compared within various contexts. These offers and requests can come from servers belonging to electronic businesses or physical businesses, or from people who likewise send or request information to share. Unlike E-mail or other forms of messages, these capsules do not have to be directed to a specific audience or request a particular resource or product. There may be no match available at a time (t1) but a match could occur at a later time (t2) within the capsule's life span. Requests and offers shown may not be for information but for a service that can be rendered or arranged electronically.

The device 16a determines how and whether information is transmitted. The information is collected and personalized to specify information and services to request or offer. An offer or request is sent 80 in a peer-to-peer or client-server environment. Some information based on personalization in the client is sent from the device 16a to the matching server 34. The information is matched with a variety of different services from other hosts that are also sending information to the server 34. The information sent by the servers can either be in the physical area of the client or they can be services that are generic services, which do not have a physical presence in the physical location occupied 17 the client.

Figure 4:
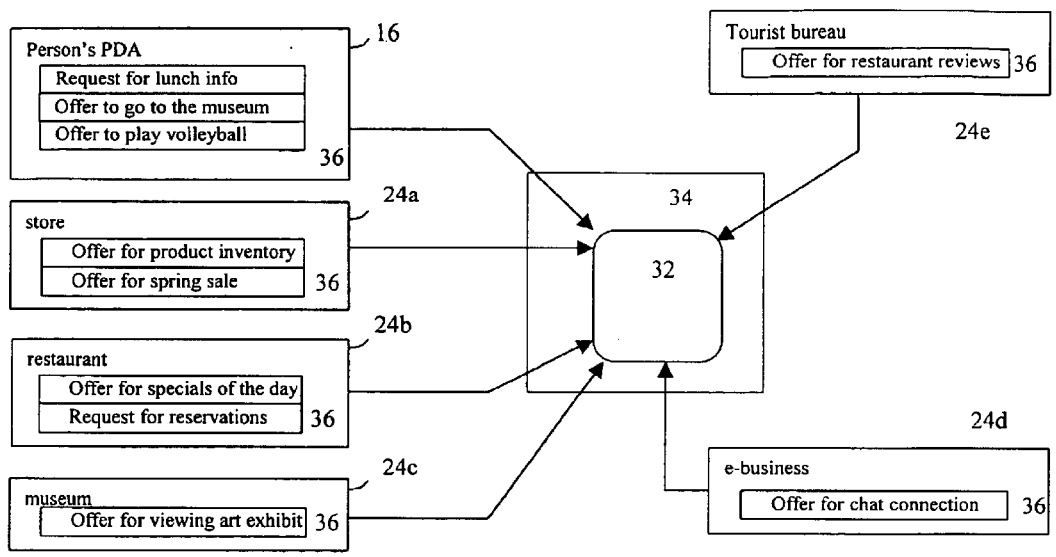
FIG. 4 is a block diagram depicting a data distribution scheme.

Referring to FIG. 4, a person, a store, restaurant, museum, tourist bureau 24e, and e-business each have shareable databases of information and services 36 stored in their PDA 16 and host computers 24a, 24b, 24c, 24d. The shareable data is sent a host's 34 matching process 32 for comparison.

Figure 5:
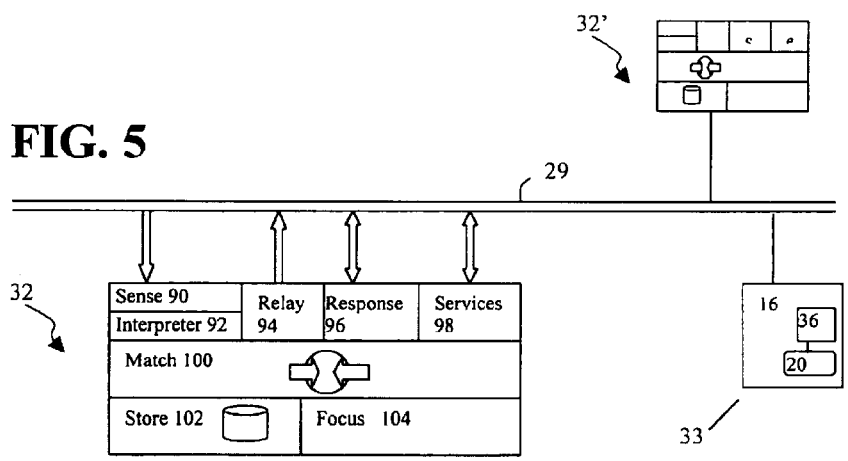
FIG. 5 is a block diagram of processing modules.

Referring to FIG. 5 a participating device e.g., 16 can include a sense process 90, an interpreter 92 and a relay process 94. The device can also include a response process 96 and a process that can provide an optional array of services 98 such as to connect on an online chat. The device 16 includes a matching engine 100 that conducts a matching process, a data store and retrieval module 102, and a module to automatically focus 104 items in the database based on context. Each device acts either as a host 32 to other devices without such functionality 33 or as a peer 32'.

TABLE 1

| | Entity | Transmittal type | Mode | On (topic) | Audience |
|---|---|---|---|---|---|
| 1 | Person | Requests | Information | Place to dine | Restaurant, tour guide, friends |
| 2 | Person | Requests | Activity | Meeting with co-worker | My company |
| 3 | Person | Requests | Information | Train schedule | Transit authority |
| 4 | Person | Requests | Connection | Conversation with friend | Friend |
| 5 | Person | Offers | Connection | Conversation with friend | Friend |

TABLE 1-continued

| Entity | Transmittal type | Mode | On (topic) | Audience |
| --- | --- | --- | --- | --- |
| 6 Retail Store | Offers | Information | Products for sale | Person |
| 7 Retail Store | Offers | Information | Hours open | Person |
| 8 Retail Store | Offers | Information | Store location | person |
| 9 Company | Offers | Information | Catalog of products | Person or company |
| 10 Company | Offers | Information | Services available | Person or company |
| 11 Company | Requests | Transaction | Purchase of products | Company |
| 12 Museum | Offers | Information | Exhibitions | Person |
| 13 Restaurant | Offers | Information | Menu | Person |
| 14 Restaurant | Requests | Activity | reservation | Person or company |
| 15 Restaurant | Offers | Information | Specials of the day | Person |
| 16 Restaurant | Offers | Information | location | Person |
| 17 Bank | Offers | Calculation | Mortgage rate | Person |
| 18 Bank | Offers | Information | Accounts available | Person or company |
| 19 Credit card company | Offers | Transaction | Credit purchase/sale | Person or company |
| 20 Credit card company | Offers | Information | Promotional interest rate | Person |
| 21 News organization | Offers | Information | Financial news | Person |
| 22 News organization | Requests | Information | Survey question | Person |
| 23 Hotel | Offers | Information | Rooms for the night | Person |
| 24 Hotel | Requests | Activity | Room reservation | person |
| 25 Transit authority | Offers | Information | Train schedules | anyone |
| 26 Search engine | Offers | Information | Web page links | Person |

Examples of shared topics are shown in TABLE 1. These topics are descriptive example listings within shared databases 36 owned by people, stores, companies, museums, restaurants, and other traditional 12*a* and electronic entities 14. Each shared topic is a request or offer for information or service, on a particular topic and for an audience. For example, a person may request information on dining. In contrast, a person may also request to meet with a co-worker. The first is a request for information, the second example is a request for an activity to occur. Requests and offers may be satisfied, i.e., matched with information and services from sources that change with location or context. The specification of audience, as will be described in detail later, is not limited to a specific person, company or URL, but in general terms that can be assigned during processing. In the present example, information on dining may be filled by offers for information from restaurant guides, newspapers, individual restaurants, and even personal sources such as friends. The matches will depend on part on the narrowness or broadness of the audience allowed. This is set by each shared element's owner and is matched to a complementary element if found. In such a situation, companies and other public entities may target their information and services to a broad audience or a very specific audience—such as tourists or shoppers, while individuals may target their shared elements in a manner more selective and personal manner.

Each shared offering or request, as exemplified in Table 1, is a small expression that can persist over time and is collected and disseminated electronically. As such, this data is an extension of a person or organization into an electronic arena, to be inspected 90, matched 100, stored 102 and relayed 94. Various participants will make offerings and requests in varying degrees of privacy. For example, the offering of a store sale is a public announcement meant to reach a broad audience, while the interest of a potential customer is a private inquiry. A potential customer may even want to be totally anonymous and 'window shop'. Privacy in this system has many facets, including the privacy of identity, of expressed interest, of transmission, information and processing. Methods for controlling the privacy during such a sharing process will be described below.

TABLE 2.

| 1.0 Person | Requests | Activity | Dinner with friends | friends |
| --- | --- | --- | --- | --- |
| 1.1 | Requests | Information | Popular places to dine | Restaurant guide |
| 1.2 | Requests | Information | Cuisine preferences | friends |
| 1.3 | Requests | Activity | Reservation | Restaurant |

Table 2 shows how individual shared elements can be combined to make a more complex 'scenario'. For example, a person's request for dinner with friends may break down to requests for information about places to dine, types of cuisine preferred, and reservations. These individual requests (or offers) may be directed to different audiences and have other different traits, but act as a unit.

As shown in Table 3, various types of requests and offers for information and services are shown.

TABLE 3

| Mode\Nature | Request to | Offer to |
| --- | --- | --- |
| Information | Request to receive information such as on a topic or from a person or organization. | Offer to provide information on topics. Sites and search engines could provide this content. |
| Transact | Request to perform a transaction | Offer to perform a transaction between |

TABLE 3-continued

| Mode\Nature | Request to | Offer to |
|---|---|---|
|  | between 2 or more parties resulting in a contractual exchange. | 2 or more parties, resulting in a contractual exchange. |
| Connect | Request to connect to a service. | Offer to connect (o a service, such as a news channel, discussion, or activity. |
| Relay | Request to relay information across networks, to people, machines across gateways. | Offer to act as intermediary to relay information from one party to another. |
| Store | Request to have information stored. | Offer to provide storage of information. |
| Calculate | Request to have a calculation performed. | Offer to perform a calculation. |
| Other | Request for custom service. | Offer for custom service. |

For example, a shared capsule can offer information on a topic with a request for information on a topic (request to receive or offer to send). A shared capsule can also request to perform a transaction or offer to perform a particular transaction—such as a credit card transaction. The shared capsule can also offer a request to connect to a person, or a discussion group or organization or offer to satisfy this connection. The shared capsule can also request to relay information or offer to perform the associated service. The shared capsule can also offer or request to have information (contained in the contents) stored, and offer or request for a calculation to be performed.

The arrangement 10 uses the shared capsule for sharing information and for matching requests and offers for information and/or services. The arrangement 10 breaks down these activities into small granular portions of information that can be acted on. Beyond sharing information, the arrangement 10 can be used to find an available computer to perform a calculation, or the best rate to finance a purchase and sale transaction, or a server to store information. Matching of requests and offers can be extended to the matching of any set of elements. Requests and offers for information and services is one example of a two-element pairing.

Figure 6A:
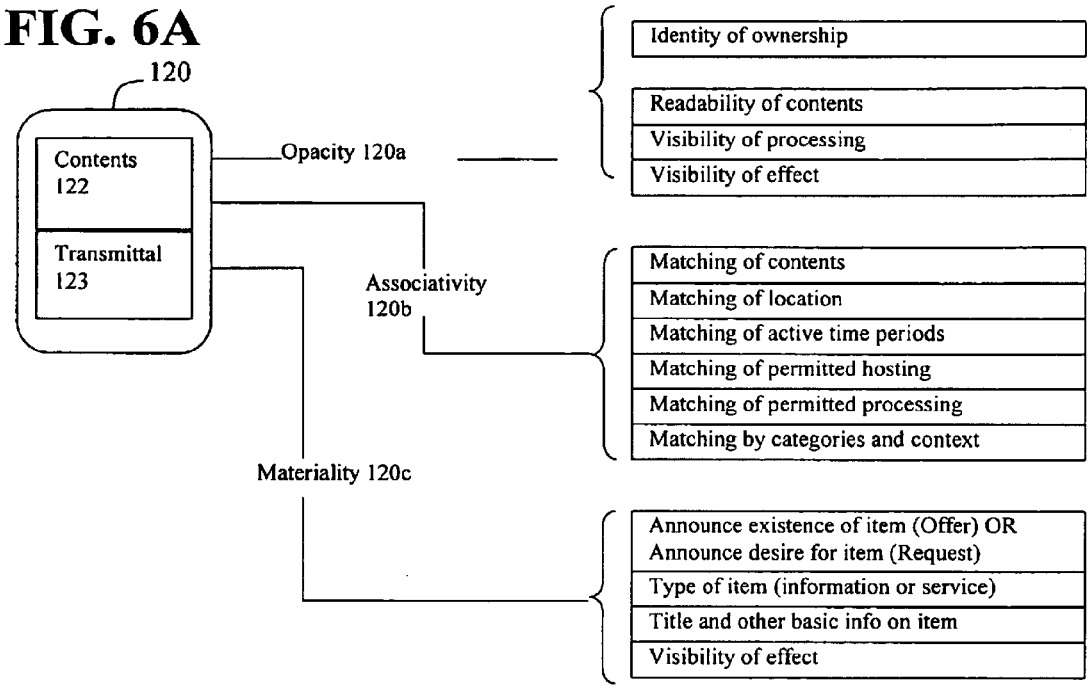
FIG. 6A is a diagram of a conceptual exchange capsule.

Referring to FIG. 6A, the shareable capsule 120 contains contents 122 and transmittal data 123 used to control the distribution, matching and privacy of the sharing. The shareable capsule 120 possesses the properties of opacity 120a, association 120b, and materiality 120c. Opacity or visibility is the degree to which its ownership is identifiable, its contents are readable, the processing of the data is visible, and the matching effect is made known to participants. The association property is the matching of the shared capsule's by its contents, location, active time periods, permitted hosting, permitted processing, and matching of categories and contexts. The materiality of the shared capsule expresses whether the capsule is an offer of existing information or service, or request for a desired information or service, and its specific type.

Figure 6B:
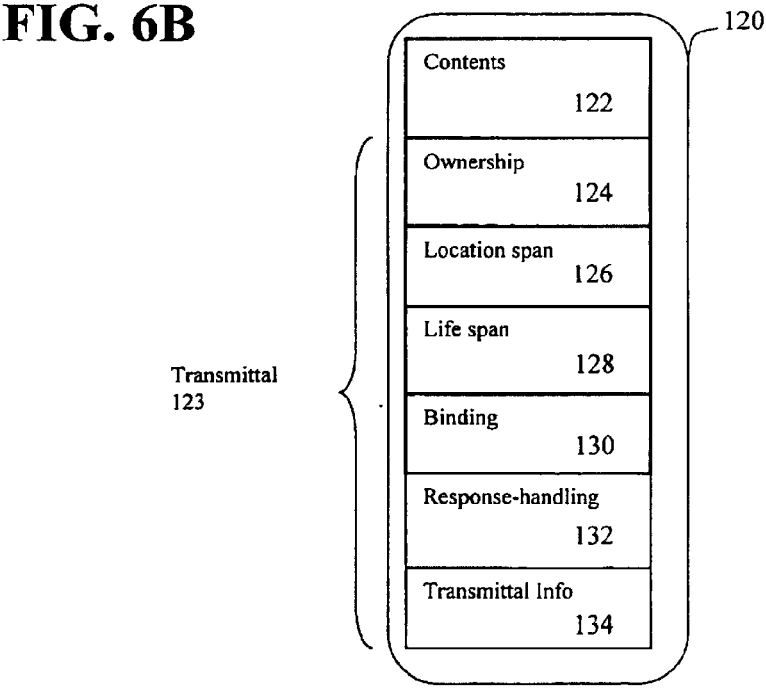
FIG. 6B is a diagram of an exchange data structure.
Figure 6C:
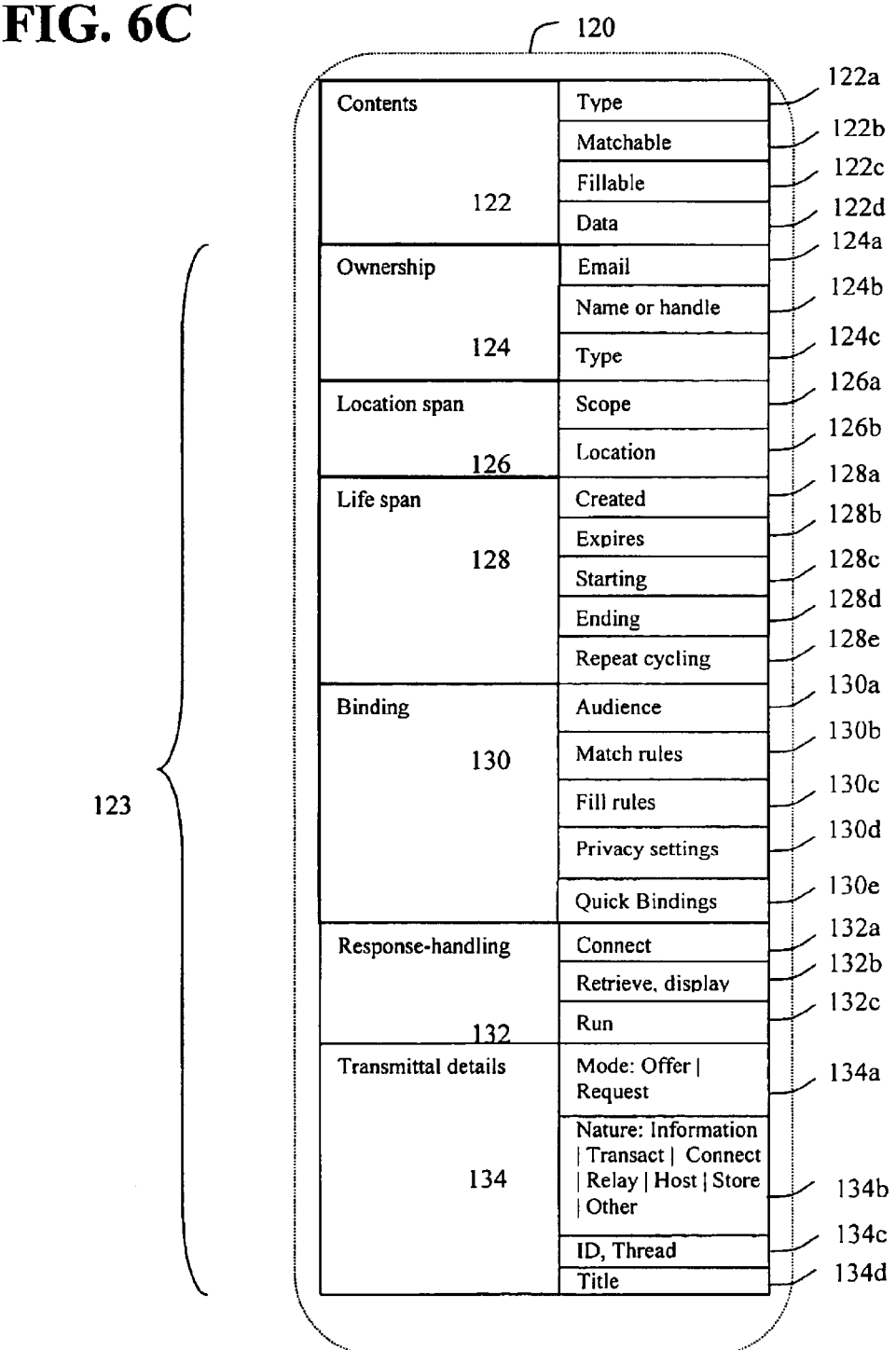
FIG. 6C is a diagram of the details of the exchange data structure.

Referring to FIGS. 6B and 6C, a data structure 120 that represents a shareable 'capsule' used to contain information shared between devices is shown. The shareable capsule includes a wrapper 121 that encapsulates content information 122 with various parameters that are used to facilitate sharing of information content. These parameters include fields for specifying ownership 124, location 126, and life span 128 of the capsule represented by the data structure 120. The data structure 120 also contains fields for specifying binding rules 130 and specifications that determine how the contents 122 can be associated with other information, how a response is handled when returned 132, and transmittal details 134 on the nature of the capsule.

The wrapper 121 (collectively fields 123) can be read and used without access to the content 122. The content 122 can be encrypted separately from its wrapping to provide added security. Individual parts of the wrapper 121 can also be encrypted separately so that only particular audiences or hosts can use this information. The ownership can be specified via a handle, to provide anonymity to the owner except to a trusted provider. The resolution of the handle can be made known only the trusted provider.

The location information is useful for mobile purposes. The data structure capsule is also encapsulated in information that pertains to a transmission protocol e.g., TCP/IP, etc., used to transmit the capsule to servers or other devices.

Referring to FIG. 7, a data structure 122 that represents the shared capsule contents is shown with example data 122'. The type of contents is "XML" 122a. The tags to be matched are listed 122b. The place-marks for contents that are to be filled during a match are identified 122c. The tagged contents data is specified 122d.

Referring to FIG. 8, a data structure 124 that represents ownership is shown with example data 124'. The primary host specifies a host computer that represents the user. The ownership type field specifies whether the named owner is a name, an email address or a handle 124a. A handle is a name that masks the identity of the owner and is known by the primary host 124c. The data contained in the capsule is thereby disassociated with its actual owner via the handle. In the example, the identifier type is a handle. The identifier is a fictitious name known to resolve to an actual client's name by the specified primary host. A user's handle can be changed frequently and be resolved to its owner by its trusted hosts.

Referring to FIG. 9, a data structure 126 that represents location information is shown. The location information is useful for mobile client devices. The user's current location can be specified in a variety of ways, for example, by decreasing scale of country, state, city, neighborhood, and street fields 126b. The scope 126a is used to specify respondent location requirements. For example, only respondents with a physical location presence may be desired. Scope could also be within a micro area such as a room, or within an office building, a city, state, country or global bounds.

Referring to FIG. 10, within a client database, the life span data structure 128 is used to test for automatic activation and distribution. After distribution, the life span of the shared capsule specifies when the material is active or relevant. Thus, the life span data structure 128 includes fields 128a–128e that specify date created, expires, starts, ends, and repeat cycling respectively. The time frame can be a period of time within each day, for a range of days. Activities such as lunch or business activities would fit into such repeating time periods.

Referring to FIG. 11, the binding data structure 128 specifies the audience 130a to which the content information is directed. The audience field 130a can be very specific, such as one person, or general such as anyone from a company. The audience can further specify the hosts that can perform the matching process. The audience 130b can also be specified generally by topic. For example, the hierarchical topic "restaurants", and a sub topic "seafood." A topic or topic hierarchy can be specified from a particular source. The binding can also specify an audience not to allow binding to. The match process is expected to honor the audience specification of each capsule. The binding data structure 130 also includes fields for match rules 130b. Match rules 130b can specify the quality of match that is acceptable, for individual aspects of the wrapper and the content. For example, location can require a precise match, preventing matches that are correct down to the city but not to the street level, for example. The matching server can be specified in priority, such as first in the local (user) device and then using a trusted host. This can control the security of the processing. The data structure 130 also includes a field 130c for rules on how material is to be filled. For example, only a summary of the contents may be filled and returned, or only a heading. A privacy setting field 130d can include a visibility setting, {IN, OUT, BOTH, IN+, OUT+} and an encryption setting. The contents and parts of the wrapper can be selectively encrypted to selectively protect its contents. A quick binding field 204e can include agreed to identifiers between known parties that can be used to signify that the item can be matched with minimal evaluation of other information. This can be specified to allow or deny matching with a particular audience with a particular id without evaluation of other aspects of the capsule.

Referring to FIG. 12, the transmittal detailed information data structure 134 has a mode field 134 that identifies the shared data package as either a request or an offer. It further has a field 134b that designates whether the mode is a request or an offer to receive, send, connect, run, transact, relay or store or calculate. The nature field is open to future modes via 'Other'. The transmittal info further identifies the package via an identifier field 134c. The identifier can include a thread id to track a sequence within a set of information exchanges. A title field 206d describes the request/offer.

Figure 13:
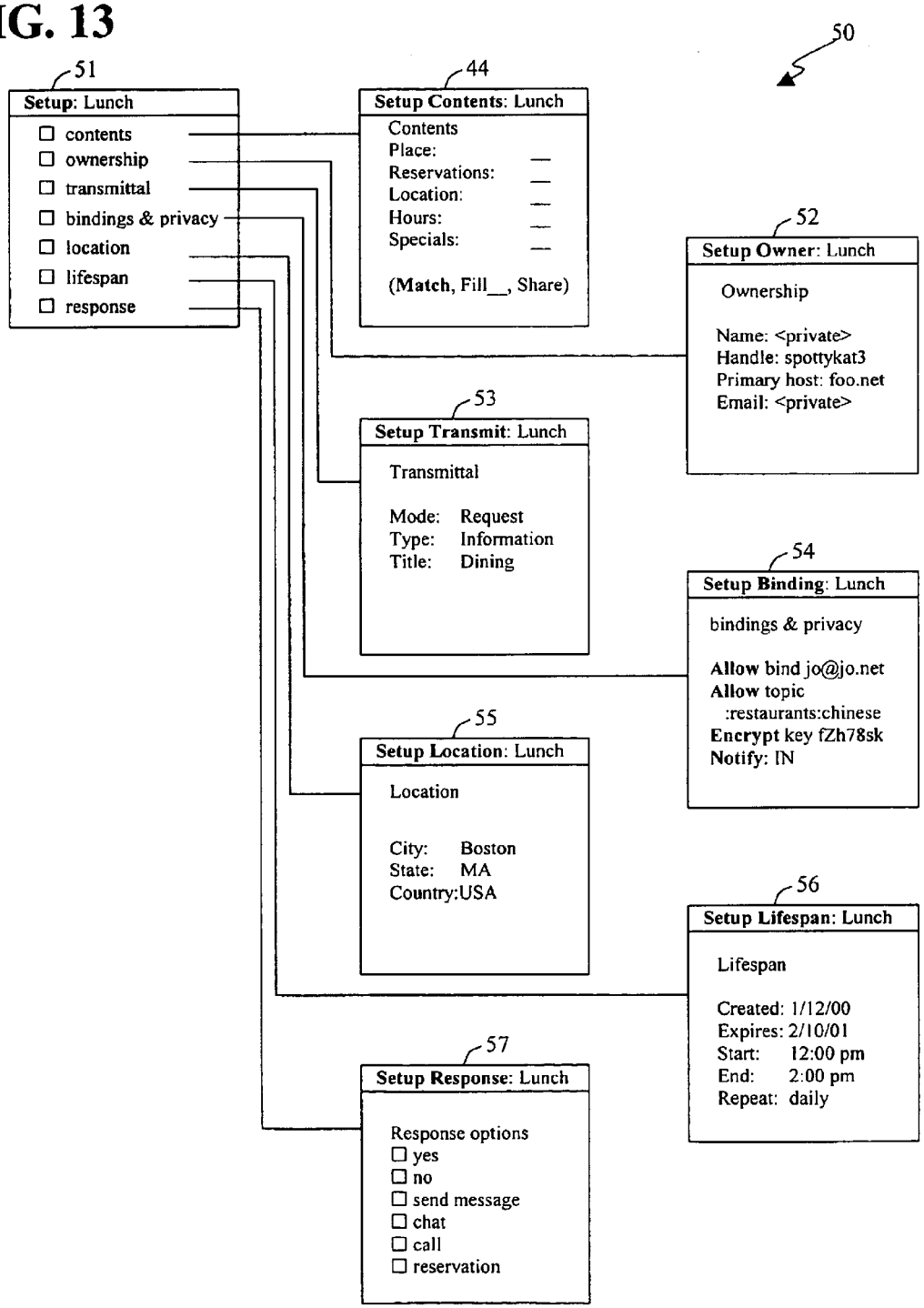
FIG. 13 is a diagram depicting client device screens for setting up capsule transmittal data.

Referring to FIG. 13, the setup of the shared capsule data structure 120 is shown as a series of screens suitable for a small computing device 50. The major setup components of the listed 51 for a particular topic 41. Some setup items are general to the person while others are specific to a topic. The content setup 44 is shown here and described earlier in FIG. 4. The setup for owner 52, transmittal details 53, binding 54, location 55, life span 56 and respond 57 are shown as small device screens.

Referring to FIG. 14A, an example 120' of a plain text representation of a shared capsule data structure 120 is shown. The capsule begins with a transmittal specification 134'. The capsule includes life span 128' and location fields 126'. The capsule also includes binding 130' and content 122' fields. In this example, the capsule 120' is an offer to send information. As such, parameters in the binding field are set to reach as wide an audience as possible, via the "Allow bind all." Furthermore, the visibility setting, as will be described in detail later, is set to "Notify OUT+." This visibility setting enables offering information outward with the option to receive notices back of matches. The binding further allows all hosts to be used for matching, and allows this information to be relayed to other hosts. The topic binding specifies sets of hierarchical topics that this information can fall under. For example, the information can be included under "restaurant" and also under "banquets". The content information 122' shown is specified as a "Fragment" as described below. The data specifies in a concise notation, "Royal Panda" as an instance of a Chinese restaurant with attributes such as the specialties and links to reservation information. This content could as well be represented in a tagged format such as HTML or XML, as shown in FIG. 14B.

Figure 15:
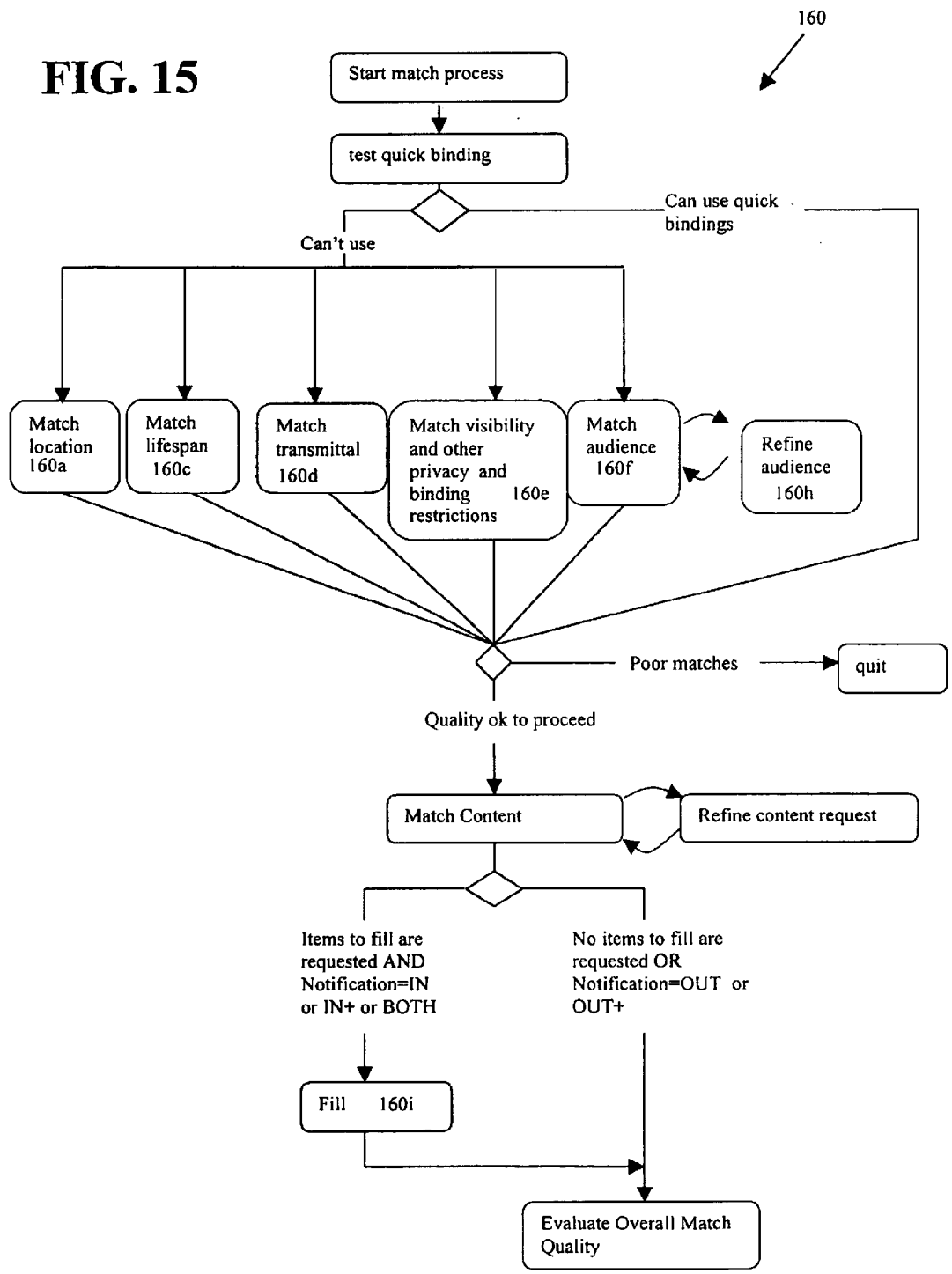
FIG. 15 is a flow chart of a match process.

Referring to FIG. 15, the match process 160 proceeds to evaluate the wrappers and process the contents of received capsules. Under some circumstances, quick binding, as described earlier in FIG. 11 204e, can allow skipping the individual matching process 160a, life span 160c, transmittal 160d, binding 160e, and audience 160f. Each match process 160a–160f can have its own settings for using or not using particular aspects of the wrapper 101. If the evaluation of the wrapper produces an adequate match, then the contents can be examined. The content matching 160g may require subsequent interactions 160h to refine the content. If there is material to supply and fill 160i, then filling is performed. Filling of missing information can be requested depending on the type of request.

Figure 16:
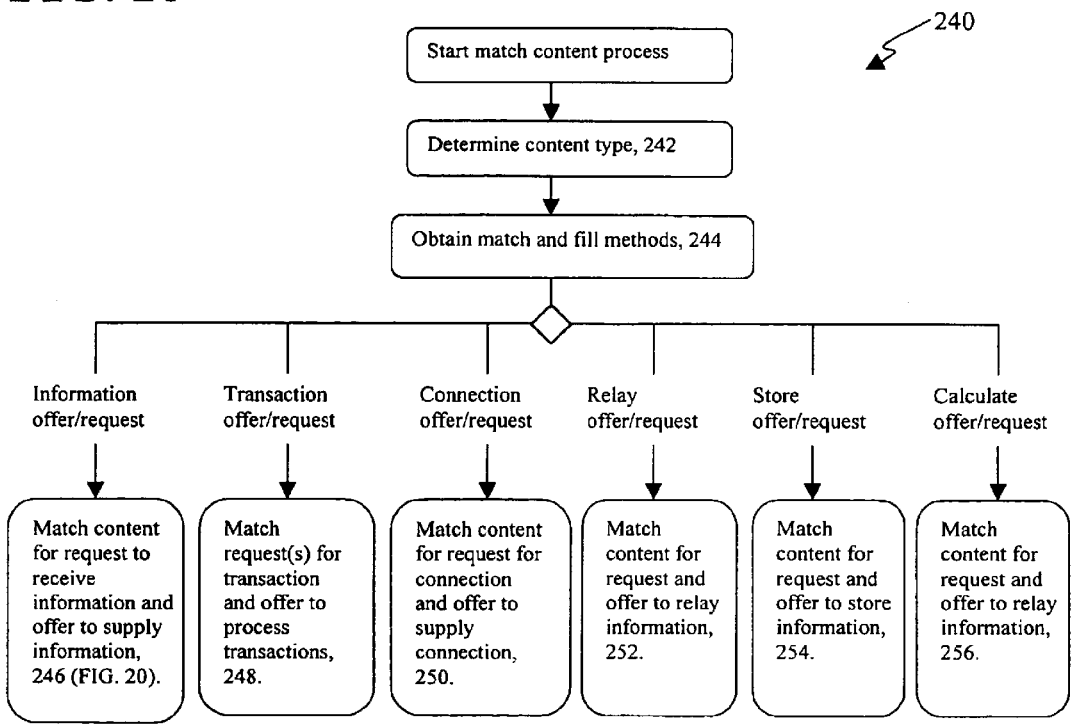
FIGS. 16–18 are flowcharts depicting aspects of a matching process.

Referring to FIG. 16, a process 240 to match content is shown. Different types of offers and requests are matched and processed accordingly. The content matching process 240 determines 242 content type and obtains 244 match and fills methods based on content type. Thus, as shown, an information offer/request matches 246 content for request to receive information with an offer to supply information. Similarly, a transaction offer/request matches 248 requests for transactions with an offer to process transactions. Other processes 250–256 for connection, relay, store, calculate, and so forth can be provided. Offers of information are only relevant to requests for information, for example. The process of matching requests and offers for information are elaborated below. Custom specified offers and requests for information and services can be specified beyond the ones shown.

Figure 17:
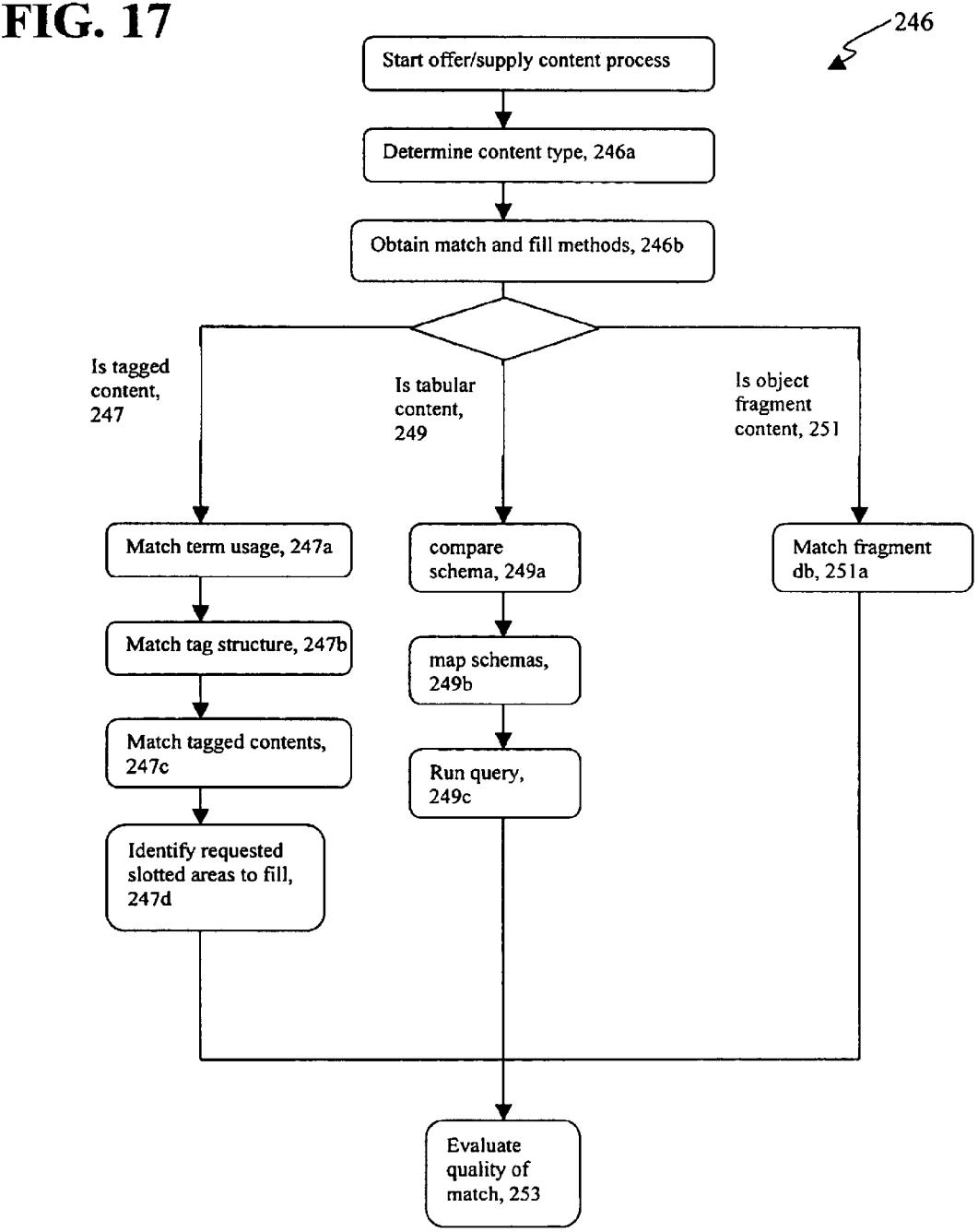

Referring to FIG. 17, matching a request and offer to provide information 246 proceeds dependent on the type of content. The process 246 determines 246a the type of content and retrieves 246b corresponding match and fill methods. The process will have different actions depending on the type of content. For tagged content 247, such as HTML or XML, the process includes matching term usage 247a, the tag structure 247b and the tagged contents 247c. This does not have to be as strict as an XML DTD (extended markup language data type definition) validation, in order to return a match. The process determines or identifies 247d requested slotted areas to fill.

For tabular content 249, the process compares 249a the database schema of the content. Since schemas from different sources may be problematic, a flexible comparison of tables, fields, and relationships may enable a mapping 249b in order to satisfy some requests. The process will run 249c a query based on the mapped schemas.

The content can also take the form of a fragment database 251, as described below. Such a database defines information as fragmented objects, in terms of classifications, instance names, attributes, values, actions, conditions and containers. The process 246 then evaluates 253 if the representation is suited for sharing and matching information.

Figure 18:
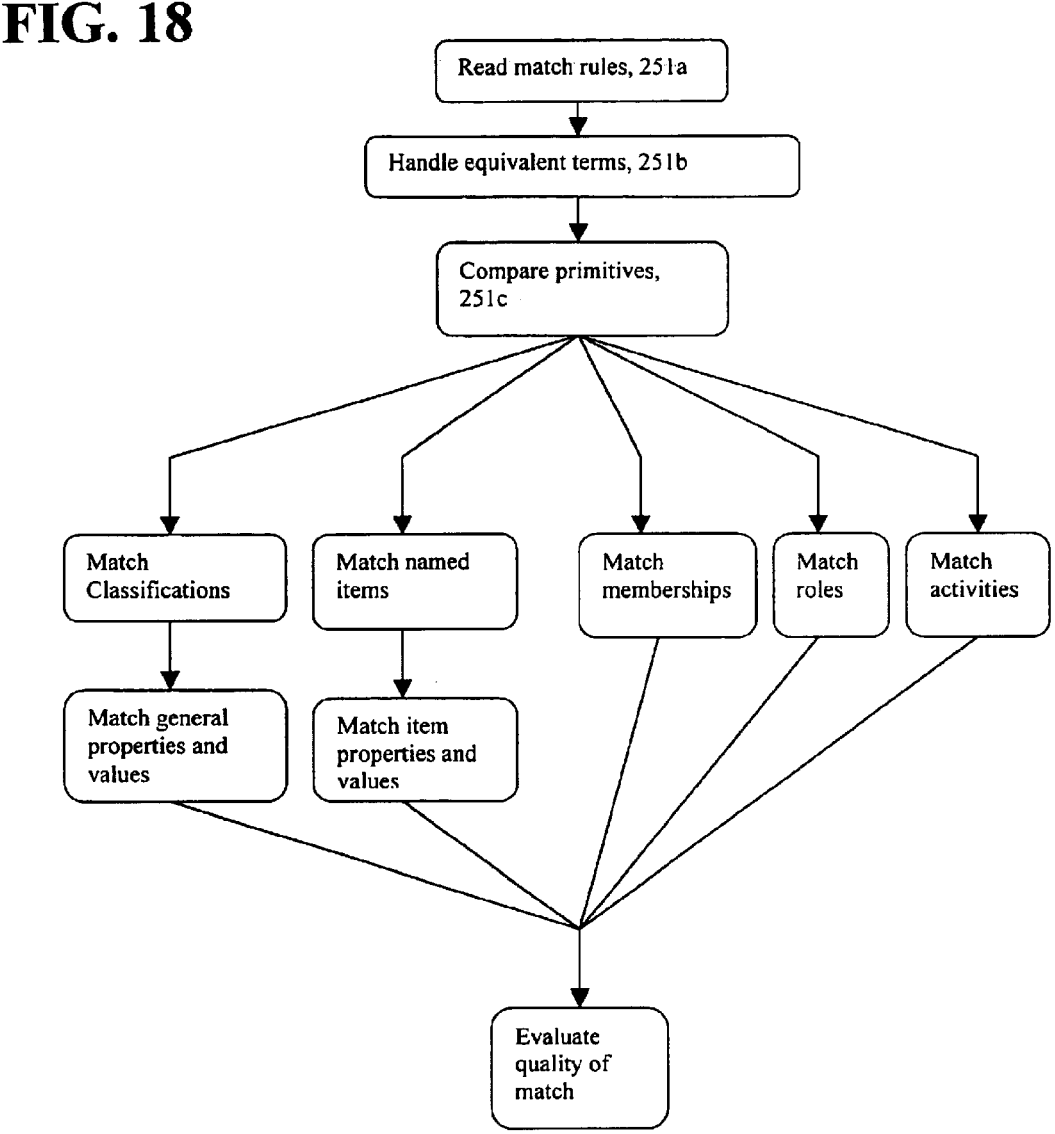

Referring to FIG. 18, for content represented as a fragment database, the content matching 251 proceeds by reading 251a match rules, standardizing 251b terms and comparing primitives 251c. Comparing primitives 251c includes matching classification sequences, matching named items, matching memberships, i.e., parts and subparts, matching roles between objects, and matching activities. The general properties belonging to a classification and particular properties belong to an instance can be matched.

Figure 19:
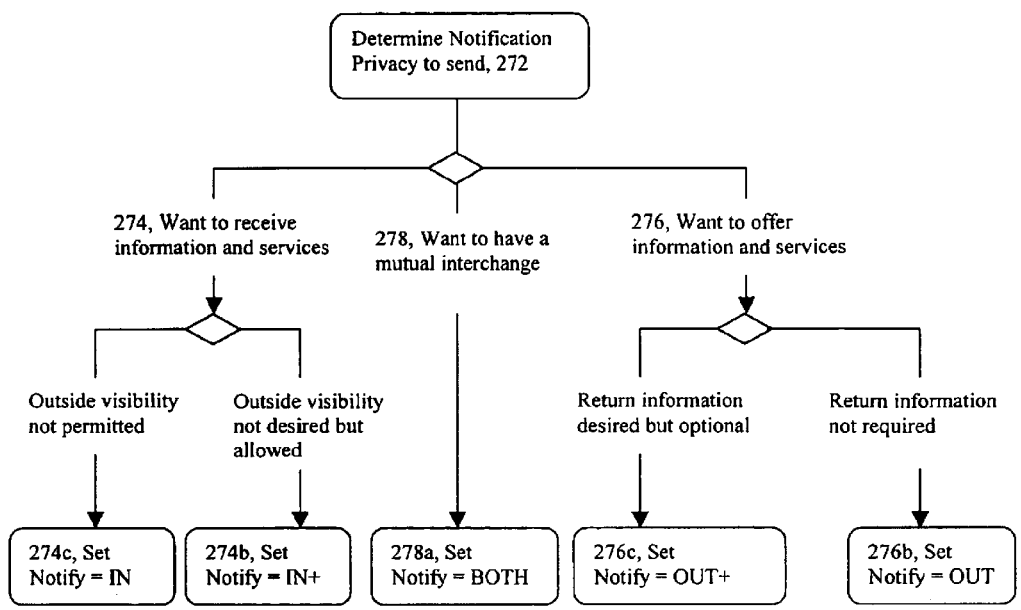
FIG. 19 is a flow chart depicting details of a visibility process.

Referring to FIG. 19, a set 270 of visibility methods are shown. TABLE 4 depicts for one embodiment allowable matches of visibility methods. In TABLE 4, "YES" entries are allowable matches, whereas "NO" entries are prohibited matches. By conforming to this visibility protocol, parties can share information and services with user-selected visibility.

TABLE 4

| Internal\External | IN | IN+ | OUT | OUT+ | BOTH |
|---|---|---|---|---|---|
| IN | NO | NO | YES | YES | NO |
| IN+ | NO | NO | YES | YES | YES |
| OUT | YES | YES | NO | NO | NO |
| OUT+ | YES | YES | NO | NO | YES |
| BOTH | NO | YES | NO | YES | YES |

As shown in FIG. 19, selecting a visibility method includes determining 272 what visibility method type to send and setting that visibility value in the visibility field of a capsule to be sent. A person who wants to 'window shop' wants to receive information 274. If such a person wants to be seen, the Notify IN+ setting is enabled 274b. Otherwise the Notify IN setting is enabled 274c, which indicates that the person does not want to be seen, i.e., identity or presence being made known to a responder.

A store that wants to offer goods and services 276 to as broad an audience as possible, would set 276b the visibility method as "NOTIFY OUT." A store that wanted to know who would like to know information about visitors would set 276c NOTIFY OUT+, to receive information if available. If a store or person desired a mutual exchange of information 278, a sent capsule would have the more restricting NOTIFY BOTH visibility method set 278a. This method would require an exchange of information.

The visibility setting for each shared data package can be determined by its intended purpose. If the purpose is to receive information and services, then the visibility is to be directed IN-ward. If outside visibility is not permitted while receiving information, then the visibility is set to "IN." If outside visibility is needed in order to receive information, then Visibility is set to "IN+."

If the purpose is to offer information and services, then the visibility is to be directed OUT-ward. If no information needs to be returned, i.e., the audience who receives such information is not identified, then visibility is set to "OUT." If identification of audience is desired if allowed, then visibility is set to "OUT+." If an exchange is desired between multiple parties with equal visibility, then visibility is set to "BOTH."

Figure 20:
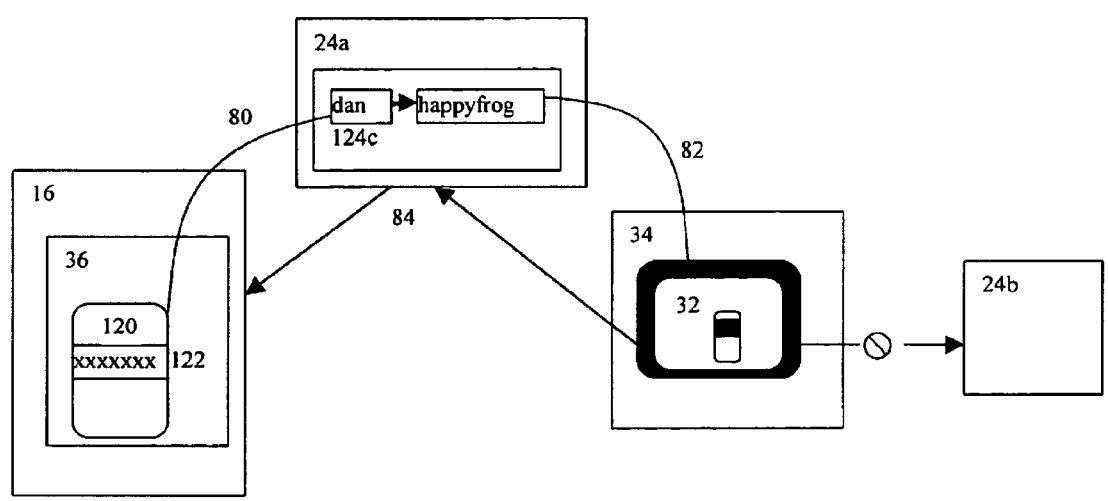
FIG. 20 is a diagram of a privacy process.

Referring to FIG. 20, a client device 16 has a shared database 36 containing a capsule 120 with content 122 and transmittal parameters 123. Some of this information is selectively encrypted such as the contents 122. This capsule is distributed 80 to a primary host computer 24a. The primary host computer knows the identity of the client device 16 user as "dan" and changes it to a handle 124c "happyfrog" before disseminating the information. From then on, the capsule's owner is shielded. The data is disseminated and collected 82 by other host computers for comparison and matching. Within a matching server 34 there is a matching process 32 that is trusted, i.e., performs matches without allowing inspection of processing or results from outside the process 32. In this example, the information from device 16 is matched with another device 24b. A successful match is responded to 84 back to the device 16, but not to the other user 24b in this example, based on visibility rules as described in FIG. 22 and Table 4., as would be the case for a visibility flag of IN.

Other embodiments are within the scope of the following claims.

What is claimed is:

1. A method of notifying users of electronic services, the method comprises:
    dynamically matching information on topics of interest stored on distributed databases with user information stored in a device, according to visibility settings in the information on the distributed databases and visibility settings in the information stored in the device; and
    notifying the user of a match in the information.

2. The method of claim 1 wherein the information stored on distributed databases and user information are stored as capsules, each capsule having a wrapping field that includes fields that contain property characteristics of the capsule and a content field that contains actual information to be shared or sent.

3. The method of claim 1 wherein matching further comprises:
    matching wrapper information from a received capsule, the wrapper information including fields with information that determines use of the information content of the capsule.

4. The method of claim 2 wherein matching wrapper information further comprises:
    matching a capsule owner, time span of the capsule, and intended audience for the capsule fields.

5. The method of claim 2 wherein matching wrapper information further comprises:
    matching rules that determine which fields are to be matched, what data are to be filled in, and what other actions are to occur if a match occurs.

6. The method of claim 2 wherein matching further comprises:
    matching content information contained in the capsule.

7. The method of claim 5 wherein the capsules are small fragments of information, having properties that allow the capsules to be used to locate and obtain further information.

8. The method of claim 2 further comprising:
    controlling the device to allow the user to specify a request or an offer for information and services; and
    sharing information from personalized databases in the device with a server device that accesses the distributed databases.

9. The method of claim 8 wherein sharing information further comprises:
    using the visibility settings in the capsules to shield information shared in the course of interaction from other parties, the visibility settings including an encryption setting to encrypt the wrapping and contents of the capsules to protect the information.

10. The method of claim 2 further comprising:
    making existence and results of a request or offer known to other devices parties only if matched capsules of the user of the electronic devices and those of the other devices have compatible visibility settings in the capsules.

11. The method of claim 2 wherein the capsules include fields specifying ownership, location, life span, binding and transmittal data.

12. The method of claim 1 wherein information in shareable databases are selectively activated based on matching information.

13. The device of claim 1 wherein information in databases of personal interests are selectively activated based on physical and electronic conditions of the device.

14. The method of claim 2 wherein the contents portion is comprised of shareable, matchable and fillable elements.

15. The method of claim 1 wherein visibility settings are set according to a visibility value in a visibility field of information sent and a visibility value in a visibility field of information stored on a user device.

16. The method of claim 1 wherein visibility settings includes a setting that allows or denies identification by other parties.

17. The method of claim 1 wherein visibility settings includes a setting that allows a client system to receive information without being made known to the sender of the information.

18. The method of claim 1 wherein visibility settings includes a setting that allows or denies access to matching by other parties.

19. The method of claim 1 wherein visibility settings includes a setting that allows or denies access to user activities or information by other parties.

20. The method of claim 1 wherein visibility settings includes a setting that requires a mutual exchange of information between a sender and a receiver.

21. A client device, comprises:
    a computing device that executes computer instructions;
    a database of personal interests;
    a storage device that stores a computer program product comprising instruction to:
    wrap content with control information designating ownership of the content, the time span the content is valid, and rules specifying how content is to be matched, with the control information further comprising fields for setting visibility settings in the information, the visibility settings determining how content information is made available to other devices.

22. The client device of claim 21 wherein the device enables the user to offer and/or request services and information based on personal interests of the user.

23. The client device of claim 21 wherein the computer program product comprises instructions to:
    set visibility settings according to at least one of a setting that allows the client device to receive information or a setting that allows the client device to receive information without being made known to the sender of the information.

24. The device of claim 21 wherein the user device is a handheld computing device.

25. The device of claim 21 wherein the user device is a portable, wireless device.

26. The method of claim 21 wherein the capsules include a directional visibility flag that is attached to a request or offer for information or services.

27. The system of claim 21 wherein offers or requests can be for information, activity, connection, calculation, or storage.

28. The client device of claim 21 wherein the computer program product comprises instructions to:
    send the capsule with the wrapper and the content information to a server device.

29. The client device of claim 21 wherein the content and the control information is stored as capsules of data, each capsule having a wrapper field that includes the control information of the capsule and a content field that contains the content information to be sent.

30. The device of claim 21 wherein the wrapper information includes information that determines the use of the information content of the capsule.

31. The device of claim 21 wherein the data capsules are small fragments of information, having properties that allow the capsules to be used to locate and obtain further information.

32. A server system, comprises:
    a matching process that matches information sent as a capsule with a wrapper from a client with information from other hosts that are also sending information to the server, the matching process comprising:
    matching wrapper information from a received capsule, the wrapper information including control information that determines how to use of the information content of the capsule with other capsules of information sent to the server, with the control information further comprising fields for setting visibility settings in the information, the visibility settings controlling how information is made available to other devices.

33. The server of claim 32 wherein the capsules include the wrapper information and content information, and the matching process further comprises:
    a matching process to complementarily match the content of the received capsule with the content from other sources of content and making the existence and results of a match of a pair of matchable capsules visible only if matched capsules have compatible visibility settings.

34. The server of claim 32 wherein the server offers and requests information, and also services.

35. A computer program product residing on a computer readable medium for notifying users of electronic services, the product comprising instructions for causing a computing device to:
    dynamically match information on topics of interest stored on distributed databases with information that is stored in a user device, according to visibility settings in the information and visibility settings in the information stored in the user device; and
    notify the user of a match in the information.

36. The computer program product of claim 35 wherein the information is stored as capsules of data having a wrapping field that includes fields that contains property characteristics of the capsule and a content field that contains actual information to be shared or sent.

37. The computer program product of claim 35 wherein instructions to match further comprise instructions to:
    match wrapper information from a received capsule, the wrapper information including information that determines the use of the information content of the capsule.

38. The computer program product of claim 36 wherein instructions to match wrapper information further comprise instructions to:
    match information about a capsule owner, a time span of the capsule, and an intended audience for the capsule.

39. The computer program product of claim 36 wherein instructions to match wrapper information further comprise instructions to:
    match rules that determine which pieces of information are to be matched, what information is to be filled in, and what other actions are to occur if a match occurs.

40. The computer program product of claim 36 wherein instructions to match further comprise instructions to:
    match content information contained in the capsule.

41. The computer program product of claim 40 wherein the data capsules are small fragments of information including a property that the small fragments can be bound to other small fragments to locate and obtain further information or new information.

42. The computer program product of claim 36 further comprising instructions to:
    control a device to allow a user to specify a request or an offer for information and services; and
    share information from personalized databases with a server device that accesses the distributed databases.

43. The computer program product of claim 42 further comprising instructions to:
    use privacy settings to shield information shared in the course of interaction from other parties, the privacy setting including a visibility setting and an encryption setting to encrypt the wrapping and contents of the capsules to protect the information.

44. The computer program product of claim 35 further comprising instructions to:
    selectively activate information in databases of personal interests based on physical and electronic conditions.

45. The computer program product of claim 35 further comprising instructions to:
    make the existence and results of a request or offer known to parties based on whether capsules exchanged between the parties have matched compatible visibility settings.

46. The computer program product of claim 35 wherein the capsules have ownership, location, life span, binding and transmittal details.

47. The computer program product of claim 35 further comprising instructions to:
    set visibility settings according to at least one of a setting that allows a device to receive information or a setting that allows the device to receive information without being made known to the sender of the information.

48. The computer program product of claim 35 wherein offers or requests can be for information, activity, connection, calculation, or storage.

49. The computer program product of claim 35 wherein the contents portion is comprised of shareable, matchable and fillable elements.

50. The computer program product of claim 35 herein information in shareable databases are selectively activated based on matching information.

* * * * *